United States Patent
Cohen et al.

(10) Patent No.: US 11,834,199 B2
(45) Date of Patent: Dec. 5, 2023

(54) HYBRID UNMANNED AERIAL VEHICLE SYSTEMS WITH AUTOMATED TETHER ASSEMBLY

(71) Applicant: Easy Aerial Inc., Brooklyn, NY (US)

(72) Inventors: Yogev Cohen, Binyamina (IL); Muhammad Galib, Brooklyn, NY (US); Ido Gur, New York, NY (US)

(73) Assignee: EASY AERIAL INC., Brooklyn, NY (US)

(*) Notice: Subject to any disclaimer, the term of this patent is extended or adjusted under 35 U.S.C. 154(b) by 287 days.

(21) Appl. No.: 17/225,781

(22) Filed: Apr. 8, 2021

(65) Prior Publication Data

US 2022/0324589 A1     Oct. 13, 2022

(51) Int. Cl.
| | | |
|---|---|---|
| *B64F 3/00* | (2006.01) | |
| *B64C 39/02* | (2023.01) | |
| *B66D 1/50* | (2006.01) | |
| *B64U 10/13* | (2023.01) | |

(52) U.S. Cl.
CPC .............. *B64F 3/00* (2013.01); *B64C 39/022* (2013.01); *B64C 39/024* (2013.01); *B66D 1/505* (2013.01); *B64U 10/13* (2023.01); *B64U 2201/202* (2023.01)

(58) Field of Classification Search
CPC . B64F 3/00; B64F 3/02; B64C 39/022; B64U 10/60; B64U 2201/202; B66D 1/12; B66D 1/24; B66D 1/36; B66D 1/485; B66D 1/50; B66D 1/66
See application file for complete search history.

(56) References Cited

U.S. PATENT DOCUMENTS

| | | |
|---|---|---|
| 9,505,494 B1 | 11/2016 | Marlow et al. |
| 9,508,263 B1 | 11/2016 | Teng et al. |
| 9,611,038 B2 | 4/2017 | Dahlstrom |
| 9,618,940 B1 | 4/2017 | Michini et al. |
| 10,761,525 B2 | 9/2020 | Bethke et al. |
| 2016/0200437 A1* | 7/2016 | Ryan .................... B64C 39/022 244/99.2 |
| 2017/0229022 A1 | 8/2017 | Gurel et al. |
| 2018/0354618 A1* | 12/2018 | Schuett ................ G05D 1/0055 |
| 2022/0380186 A1* | 12/2022 | Chao ..................... B65H 59/384 |

FOREIGN PATENT DOCUMENTS

| | | |
|---|---|---|
| CN | 106712160 A | 5/2017 |
| WO | 2017065411 A1 | 4/2017 |

* cited by examiner

*Primary Examiner* — Joshua J Michener
*Assistant Examiner* — Arfan Y. Sinaki
(74) *Attorney, Agent, or Firm* — Carter, DeLuca & Farrell LLP; George Likourezos; Jason B. Scher (57) ABSTRACT

An unmanned aerial vehicle system includes an unmanned aerial vehicle, a user input device, and ground station. The user input device is configured to generate a signal and control the unmanned aerial vehicle based on the generated signal. The ground station is coupled to the unmanned aerial vehicle via a tether assembly. The ground station includes a motorized spool and a controller. The motorized spool is coupled to the tether assembly and configured to electromechanically control spooling and unspooling of a tether of the tether assembly. The controller is configured to control operation of the motorized spool based on an anticipated movement of the unmanned aerial vehicle.

20 Claims, 5 Drawing Sheets

FIG. 5 ized spool is coupled to the tether assembly and configured to electromechanically control spooling and unspooling of a tether of the tether assembly. The controller is configured to control operation of the motorized spool based on an anticipated movement of the unmanned aerial vehicle.

In aspects, the ground station may further include a sensor disposed between the motorized spool and the tether assembly configured to detect a tension force between the unmanned aerial vehicle and the ground station.

In aspects, the controller may be further configured to control operation of the motorized spool based on the detected tension force.

In aspects, the controller may be configured to set the motorized spool to wind or unwind based on the anticipated movement of the unmanned aerial vehicle causing anticipated slack in the tether assembly and set a spooling rate of the motorized spool to match a rate of the anticipated movement.

In aspects, the controller may be configured to set the motorized spool to unspooling based on the anticipated movement of the unmanned aerial vehicle causing anticipated tension in the tether assembly and set an unspooling rate of the motorized spool to match a rate of the anticipated movement.

In aspects, the anticipated movement of unmanned aerial vehicle may be determined based on the generated signal used to control the unmanned aerial vehicle.

In aspects, the anticipated movement of unmanned aerial vehicle may be determined based on the detected tension force meeting a predetermined threshold.

In aspects, the detected tension force meeting the predetermined threshold may be caused by at least one of environmental conditions acting on the unmanned aerial vehicle or loss of power of the unmanned aerial vehicle.

In aspects, the anticipated movement of the unmanned aerial vehicle may be an activation of a quick release mechanism of the unmanned aerial vehicle and the controller is configured to set the motorized spool to spooling based on the activation of the quick release mechanism of the unmanned aerial vehicle rapidly causing anticipated slack in the tether assembly and the controller is configured to set a spooling rate of the motorized spool to exceed a rate of descent of the tether assembly.

In aspects, the anticipated movements may include at least one of throttle high, throttle low, yaw left/right, pitch forward/backwards, and/or roll left/right.

In another aspect, the present disclosure provides a method of closed loop control of a tether assembly of an unmanned aerial vehicle includes: determining an anticipated movement of the unmanned aerial vehicle; setting, based on the anticipated movement, a motorized spool to one of spooling or unspooling; setting a speed of the motorized spool based on an anticipated rate of the anticipated movement of the unmanned aerial vehicle; and activating, prior to movement of the unamend aerial vehicle, the motorized spool to electromechanically control spooling and unspooling of a tether of the tether assembly to prevent one of slack or tension in the tether assembly.

In aspects, the anticipated movement may be determined based on a UAV signal generated by a user input device.

In aspects, the UAV signal generated by the user input device may be configured to control the unmanned aerial vehicle.

In aspects, the anticipated movement may be determined based on a tension force, sensed by a sensor disposed

HYBRID UNMANNED AERIAL VEHICLE SYSTEMS WITH AUTOMATED TETHER ASSEMBLY

TECHNICAL FIELD

This disclosure relates to aircraft, and more particularly, to hybrid unmanned aerial vehicle (UAV) systems and methods for adaptively controlling a tether mechanism for a UAV.

BACKGROUND

Tether-assembly "drone-in-a-box" systems offer uninterrupted flight time within a predefined area, as the drone is powered via a tether assembly to a base system. Typically, UAV tether assemblies exist in two categories—passive and active. In its simplest form, a passive tether assembly consists of a coiled cable, anchored at one end to an object on the ground (or some other baseline), and connected at the other end to the UAV. The passive tether assembly has a singular purpose: to contain the UAV within a defined area. More advanced forms of a passive tether assembly may be conductive, delivering constant power and possibly data to the UAV. In both cases, the unspooling of a tether of the tether assembly is achieved passively as the UAV climbs in altitude, and spooling of the tether is achieved manually, externally to the system.

An active tether assembly includes a motorized spool and other electronics/sensors that allow it to electromechanically spool or unspool the tether thereof. The input which triggers spooling or unspooling of the tether is a measure of the tension on the already unspooled cable. This is achieved in many ways, but in all cases, the active tether assembly reacts to the tension in the tether. Tension in the tether is modified by the UAV changing altitude, by wind blowing across the tether, and other factors as well. Reactive tethered assemblies work well but are limited in many ways by their reactive design. The speed at which the tether spools or unspools is static and therefore unable to adjust to different scenarios in which the UAV is flying. Additionally, because tension sensing mechanism of these active tether assemblies are coupled to the UAVs motion through the tether thereof (a long flexible cable), delayed response, discontinuous changes in altitude, and inconsistent tether tension often result. In some cases, the limitations of the active tether assembly create situations in which there is tremendous slack in the tether during a descent. This can cause the tether to become ensnared by nearby objects, especially in high wind operations.

SUMMARY

To control movement of the UAV more efficiently, the present disclosure provides an integrated, closed loop tether mechanism whose trigger for spooling or unspooling the tether is the same as commands that control the UAV flight characteristics. Accordingly, the fully closed loop tether mechanism is dynamically adaptable to live operational conditions.

In one aspect, the present disclosure includes an unmanned aerial vehicle, a user input device, and a ground station. The user input device is configured to generate a signal and control the unmanned aerial vehicle based on the generated signal. The ground station is coupled to the unmanned aerial vehicle via a tether assembly. The ground station includes a motorized spool and a controller. The between the motorized spool and the tether assembly, meeting a predetermined threshold.

In aspects, the tension force meeting the predetermined threshold may be caused by at least one of environmental conditions acting on the unamend aerial vehicle, environmental conditions acting on the tether assembly, or a loss of power of the unmanned aerial vehicle.

In aspects, the anticipated rate of the anticipated movement of the unmanned aerial vehicle may be based on the rate of change in the tension force.

In aspects, the anticipated movement of the unmanned aerial vehicle may be an activation of a quick release mechanism of the unmanned aerial vehicle, and the anticipated rate of the anticipated movement may be a spooling rate that exceeds a rate of descent of the quick release mechanism of the unmanned aerial vehicle.

In aspects, the anticipated movement may be at least one of: throttle high, throttle low, yaw left/right, pitch forward/backwards, or roll left/right.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Figure 1:
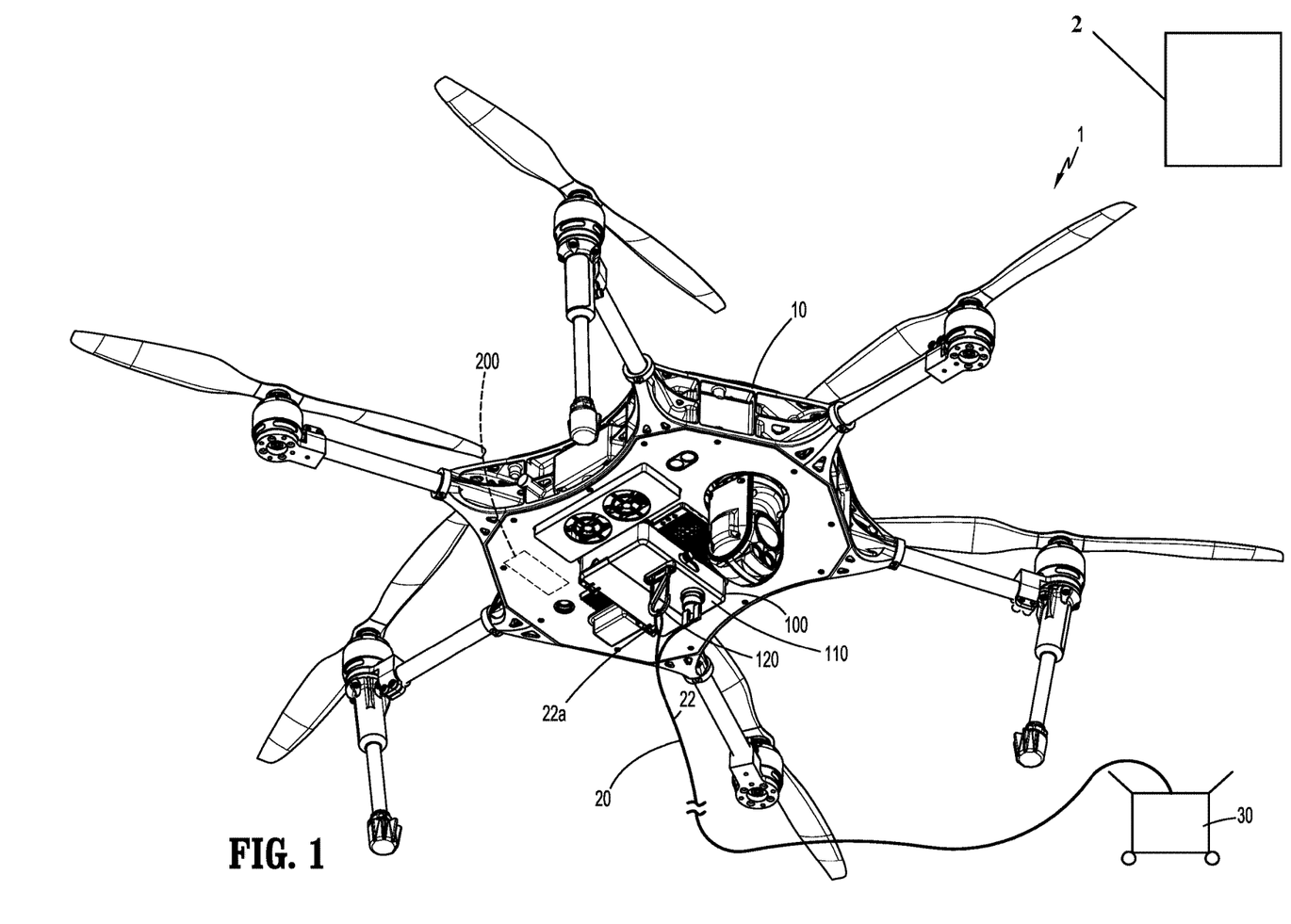
FIG. 1 is a perspective view of a UAV system in accordance with the principles of this disclosure.
Figure 2:
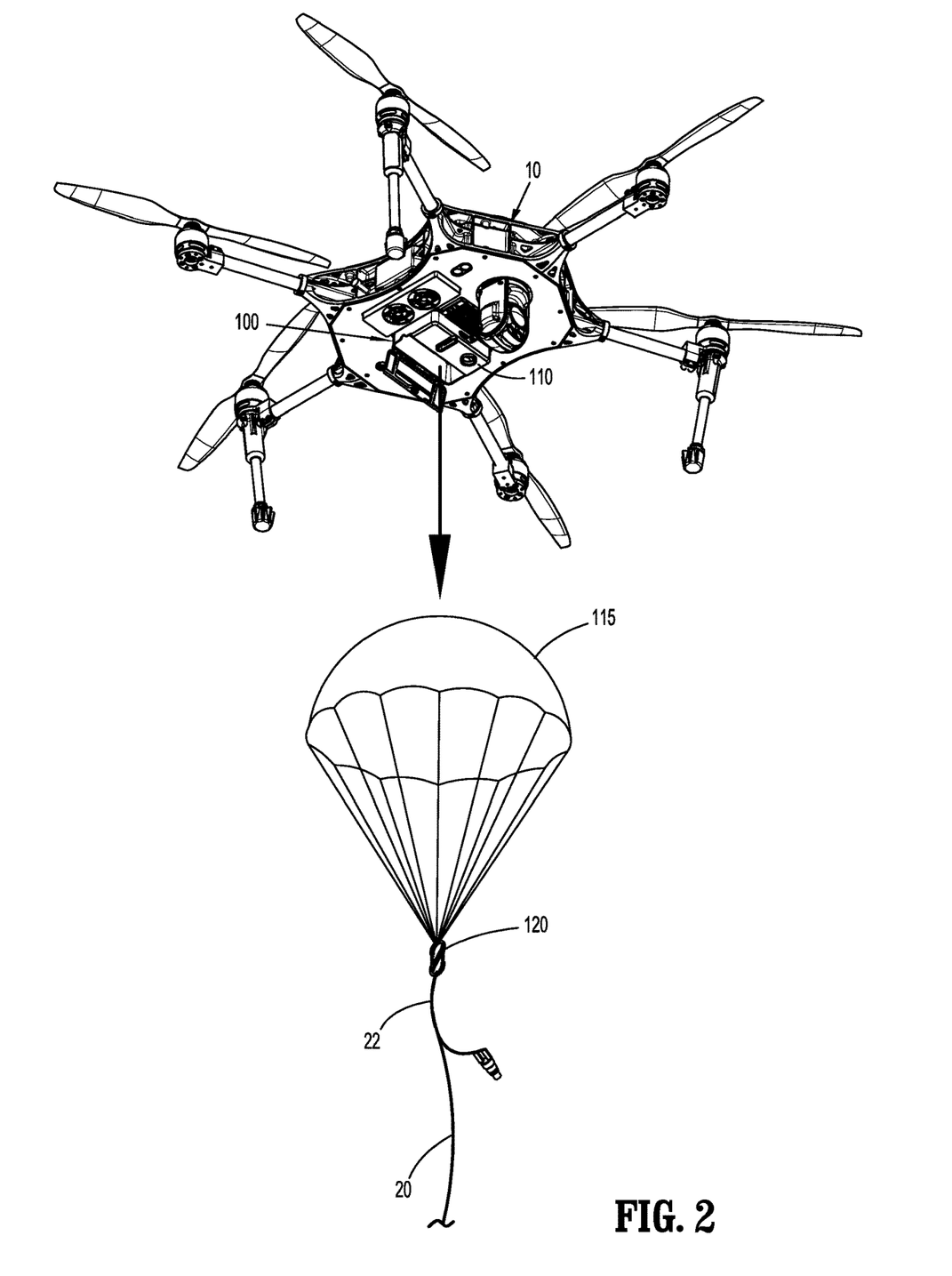
FIG. 2 is a perspective view of a quick release mechanism being actuated to separate a tether assembly from the UAV.

FIGS. 1 and 2 illustrate an unmanned aerial vehicle (UAV) system 1 including a UAV 10, a tether assembly 20, a ground station 30, a quick release mechanism (QRM) 100 that facilitates a releasable attachment of a first end of tether assembly 20 to UAV 10, and a computing device or controller 200 that facilitates operation of UAV 10 and/or components thereof. Controller 200 can be disposed in electrical communication with the various components of UAV system 1, for example, to send and/or receive UAV signals related to deployment, separation of UAV 10 from tether assembly 20, flying, and/or landing. The ground station 30 supports a second end of the tether assembly 20 for stabilizing a position of UAV 10 relative to the ground station 30 and for communicating with, and/or delivering power to, UAV 10. Ground station 30 and/or UAV 10 can include one or more controllers 200 and 300 configured to electrically communicate with one another.

Briefly, UAV 10 generally includes a plurality of components for operating UAV 10 such as a computing system, a propulsion system, a rechargeable battery, a positioning system, a video system, a wireless communication transceiver, etc. (some of which are not explicitly shown). Components such as the wireless transceiver and/or computing systems can be configured to communicate video, geolocation from the positioning system, and any relevant status of the UAV, or components thereof, such as battery status of the UAV, to the ground station or other monitoring stations in accordance with any suitable techniques known to persons of ordinary skill in the art.

QRM 100 of UAV system 1 generally includes a housing 110 defining a drag device cavity (not shown) for removably supporting a drag device 115 such as a parachute, winged deployment device, mini drone, etc. (see FIG. 2), and a hook assembly 120 (e.g., a carabiner). Tether assembly 20 of UAV system 1 includes an attachment segment 22 at one end of tether assembly 20, the other end of tether assembly 20 being secured to ground station 30. Attachment segment 22 extends to a distal snare 22a for securing tether assembly 20 to hook assembly 120 of QRM 100 and configured to electrically coupled to QRM 100 for transmitting data and power between UAV 10 and ground station 30 of UAV system 1.

UAV 10 is configured to separate from tether assembly 20 by deploying the drag device (not shown) coupled to hook assembly 120 which separates from QRM 100 and fall freely therefrom. With drag device 115 secured to hook assembly 120, drag device 115 falls from QRM 100 and opens up, slowing the decent of tether assembly 20 back toward ground station 30. Once drag device 115 and hook assembly 120 are separated from UAV 10, UAV 10 is free to fly anywhere as desired. UAV 10 can return to ground station 30, for example, when a free flying mission is complete or a repair, or recharging, etc. are necessary. Drag device 115 can then be reattached to UAV 10 via QRM 100 by positioning drag device 115 into housing 110 and resecuring hook assembly 120.

For a more detailed description of such UAVs and/or ground stations, one or more components of which can be incorporated into, or modified for use with the components of this disclosure, reference can be made, for example, to U.S. Pat. No. 9,811,083, issued Nov. 7, 2017, U.S. patent application Ser. No. 16/937,937, filed Jul. 24, 2020, and U.S.

patent application Ser. No. 17/143,070, filed Jan. 6, 2021, the entire contents of each of which are incorporated by reference herein.

Figure 3:
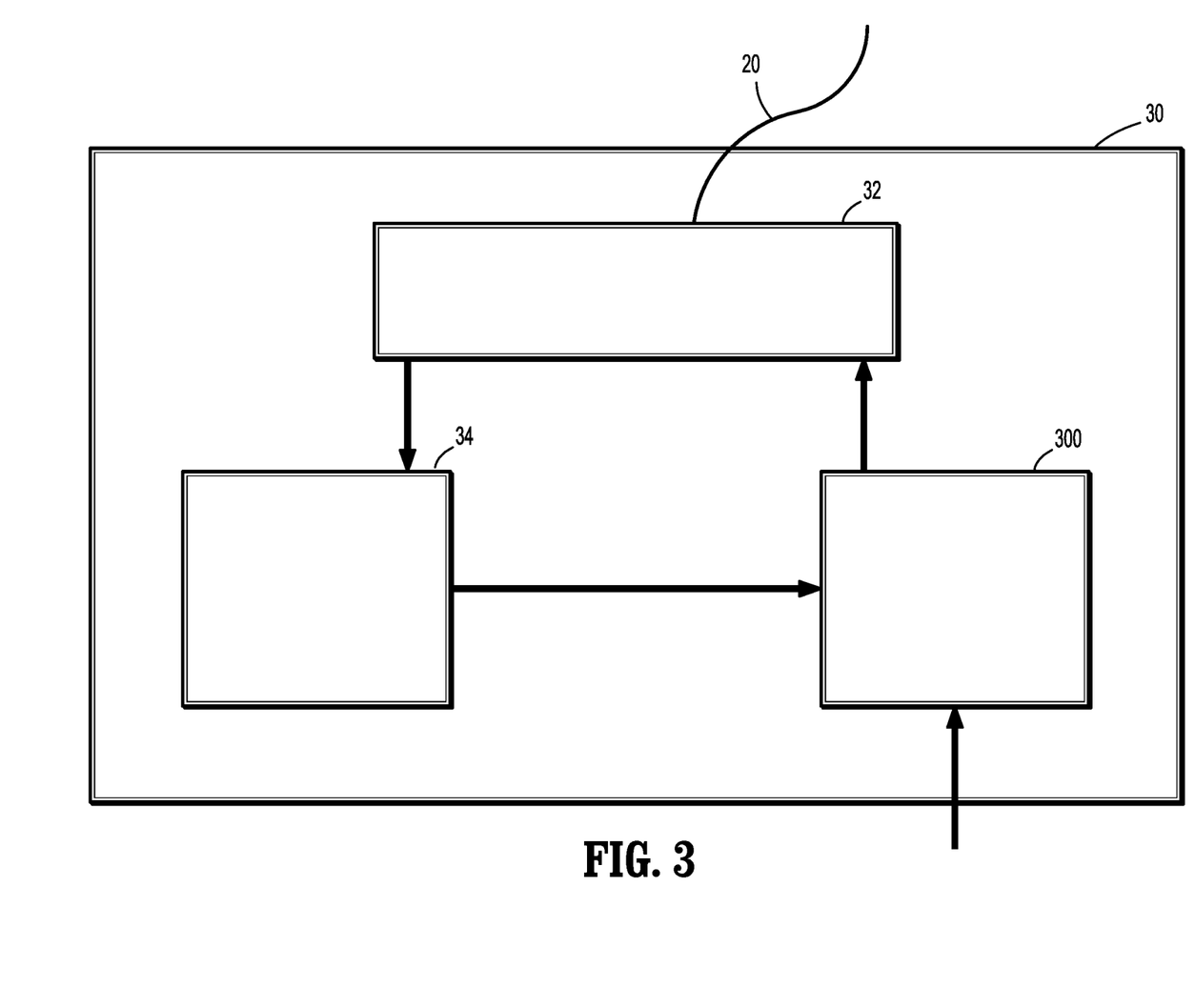
FIG. 3 is a block diagram of a ground station of the UAV system of FIG. 1.

With additional reference to FIG. 3, ground station 30 further includes a motorized spool 32, a sensor 34, and a controller 300, as noted above, in communication with controller 200 of UAV 10 for establishing a closed-looped control of motorized spool 32. Motorized spool 32 is configured to electromechanically control spooling and unspooling of tether assembly 20 about motorized spool 32 (and which can include maintaining motorized spool 32 in one or more fixed positions to prevent any spooling and/or unspooling for a given time). Indeed, motorized spool may include any suitable drive and/or braking mechanisms (e.g., gears, motors, etc.) to selectively control actuation (and/or stabilization, e.g., little or no spooling/unspooling rotation) of motorized spool 32. Motorized spool 32 rotates a tether of the tether assembly 20 about the spool 32 in a counterclockwise (or clockwise) direction to selectively wind the tether assembly 20, thereby adjusting an amount of tension in the tether assembly 20 to control the positioning of UAV 10 relative to ground station 30. Motorized spool 32 rotates the tether of the tether assembly 20 about the spool 32 in a clockwise (or counterclockwise) direction to selectively unwind the tether assembly 20, thereby adjusting an amount of slack in the tether assembly 20 to control the positioning of UAV 10 relative to ground station 30. Sensor 34 may be disposed between (and/or adjacent to) motorized spool 32 of ground station 30 and/or hook assembly 120 of QRM 100. Sensor 34 is positioned and configured to detect a tension force between motorized spool 32 and hook assembly 120 to assist in dynamic control of motorized spool 32. Controller 300 of ground station 30 is configured to control operation (e.g., rotation speed, angular orientation, etc.) of motorized spool 32 based on received UAV signals from controller 200 and/or sensed tension force from sensor 34 to dynamically control spooling and/or unspooling of tether assembly 20 to prevent unnecessary slack or tension in tether assembly 20 based on anticipated movement or anticipated positioning of UAV 10 (and/or anticipated environmental changes in relation to such anticipated movement and/or positioning). In some instances, anticipated movement includes anticipated positioning. For example, the received UAV signal can be a signal to instruct or cause the UAV 10 to move in a predetermined direction and/or to a predetermined position. Motorized spool 32 receives the signal/instruction and proactively winds and/or unwinds the tether assembly 20 about the spool 32 based on the anticipated movement/positioning in a predictive manner (e.g., prior to such anticipated movement and/or positioning). In some instances, UAV 10 can include any number and/or type of sensors for determining environmental conditions (e.g., changes in altitude, pressure, precipitation, debris, birds, wind, humidity, temperature) that may affect an amount of slack or tension in the tether assembly 20 needed for enabling the UAV 10 to efficiently and effectively effectuate any anticipated movement and/or positioning thereof. Such sensed environmental conditions can enable controllers 200/300 to cause motorized spool 32 rotate in anticipation of any additional slack or tension in tether assembly 20 required as a result (or expected result) of those environmental conditions.

Figure 4:
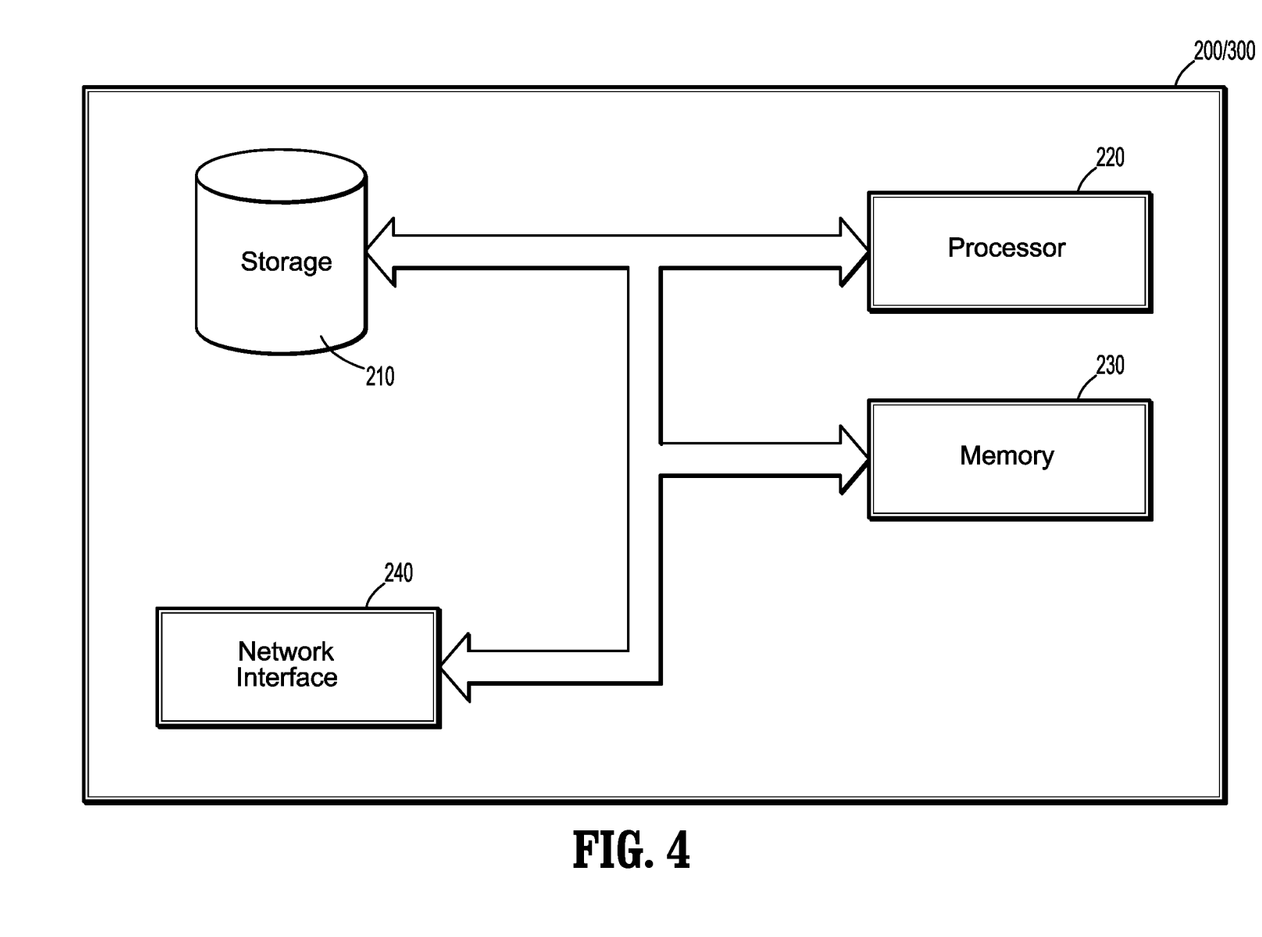
FIG. 4 is a block diagram of a controller of the UAV system of FIG. 1.

With reference to FIG. 4, and as noted above, controller 200 and/or 300 can be utilized to effectuate operation of UAV system 1 and/or components thereof. Notably, the controller 200 can include a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on controller 200 and/or 300, or on a user device, including, for example, on a mobile device, an IoT device, or a server system.

Operational control of motorized spool 32 will be described with reference to FIG. 5. Initially, while UAV 10 is coupled to ground station 30 via tether assembly 20, UAV 10 can be deployed, for example, to effectuate a mission (e.g., surveillance). UAV 10 can be self-directed (autonomous, semi-autonomous, etc.) and/or controlled by a user input device 2 (see FIG. 1) and via various sensors and/or preprogrammed algorithms/instructions stored on memory (and which instructions can be executed by processor(s) of controllers 200/300). Controller 200 is configured to generate UAV signals, such as, for example UAV battery status, UAV location, UAV status, UAV environmental, UAV instructional command, and UAV flight commands to facilitate operation of UAV 10. UAV flight commands, for instance, can include movement commands such as, throttle high, throttle low, yaw left/right, pitch forward/backwards, and roll left/right. UAV instructional commands, for instance, can include, quick release and/or base return.

At step 400, based on the generated UAV signal, controller 300 receives the UAV signal from controller 200. In some instances, controller 300 also receives a tension force of tether assembly 20 via sensor 34. Upon receipt of the UAV signal, at step 410, controller 300 determines an anticipated movement/positioning of UAV 10 based on the UAV signal, such as, UAV flight command or UAV instructional command. Anticipated movement/positioning includes throttle high, throttle low, yaw left/right, pitch forward/backwards, roll left/right, quick release, base return, GPS locations, longitudinal/latitudinal positions, altitudes, orientations, directions, speeds, acceleration, turning, addresses, areas, zones, etc., and/or any other suitable movement or positioning of UAV 10. Advantageously, the presently disclosed system proactively controls motorized spool 32 and tether assembly 20 slack/tension to enable UAV 10 to fly/land/takeoff efficiently and to enable tether assembly 20 to safely ascend/descend by limiting unnecessary slack/tension and/or undesired ensnaring of the tether assembly 20 on objects.

Once the anticipated movement/positioning of UAV 10 is determined, at step 420, controller 300 dynamically sets motorized spool 32 to wind or unwind to adjust slack/tension and improve efficiencies in flight of UAV 10 based on the anticipated movement/positioning of UAV 10. For instance, controller 300 sets motorized spool 32 to spooling to prevent unnecessary slack in tether assembly 20 and controller 300 sets motorized spool 32 to unspooling to prevent unnecessary tension in tether assembly 20. Additionally, and/or alternatively, controller 300 dynamically determines whether to set motorized spool 32 to wind/unwind based on the anticipated movement/positioning and tension force of the tether assembly 20 meeting or surpassing one or more predetermined tension thresholds. For example, the predetermined tension threshold may have a first tension threshold to account for a maximum amount of tension allowed in tether assembly 20 to avoid inefficiencies in flight, and a second tension threshold directed to a maximum amount of slack allowed to avoid entanglement of tether assembly 20 during flight.

Once controller 300 sets motorized spool 32, at step 430, controller 300 can dynamically set rotation speeds/accelerations/decelerations and/or angular orientations (or a range of speeds/accelerations/decelerations) of motorized spool 32 based on an anticipated rate of the anticipated movement/positioning of UAV 10. Such rotation speed/acceleration/deceleration and/or angular orientations of motorized spool 32 can be arranged for any suitable time duration and/or interval, which may be preprogrammed based on one or more predetermined data, or dynamically determined by controllers 200/300 and/or sensors (e.g., sensor 34) via one or more sensed conditions, anticipated rates of the anticipated movement/positioning of UAV 10, and/or rates of change of the tension force.

Once controller 300 sets motorized spool 32 to wind/unwind and, for example, the rotation speed of motorized spool 32, at step 440, controller 300 activates the motorized spool 32 simultaneously with an actual movement of UAV 10, therefore preventing unnecessary slack and/or tension in tether assembly 20 during actual movement. Additionally, and/or alternatively, based on external factors, such as, for example environmental changes, as noted above, tension force may be utilized to account for variation in the actual movement in view of the anticipated movement determined by the UAV signal. During and/or after activation of the motorized spool 32, controller 300 returns to step 400, and receives UAV signal and/or tension force to further adjust motorized spool 32 to anticipate the movement of UAV 10 more accurately. Additionally, and/or alternatively, controller 300 passively receives UAV signal and/or tension force during each step to anticipate sudden changes in the anticipated movement/positioning of UAV 10.

For example, in accordance with step 410, if the anticipated movement/positioning of the UAV 10 is to ascend based on the UAV signal received being throttle high, controller 300, in accordance with step 420, can set motorized spool 32 to unspooling and, in accordance with step 430, can set rotation speed of motorized spool 32 to match the anticipated rate of ascent of UAV 10.

In another example, in accordance with step 410, if the anticipated movement of the UAV 10 is to descend based on the UAV signal received being throttle low, controller 300, in accordance with step 420, can set motorized spool 32 to spooling and, in accordance with step 430, can set rotation speed of motorized spool 32 to match the anticipated rate of descent of UAV 10.

In still yet another example, in accordance with step 410, if the anticipated movement of the UAV 10 is to yaw left/right based on the UAV signal received being yaw left/right, controller 300, in accordance with step 420, can set motorized spool 32 to wind/unwind based on location of UAV 10 compared to ground station 30 and, in accordance with step 430, can set rotation speed of motorized spool 32 to match the anticipated yaw rate of UAV 10. In some instances, motorized spool 32 may be set to wind/unwind based the anticipated movement/positioning and the tension force of tether assembly 20 meeting or surpassing the predetermined tension threshold. Accordingly, the rotation speed of motorized spool 32 can be set by controller 300 to match the rate of change in tension force of tether assembly 20.

In still another example, in accordance with step 410, if the anticipated movement of the UAV 10 is pitch forward/backward based on the UAV signal received being pitch forward/backward, controller 300, in accordance with step 420, can set motorized spool 32 to wind/unwind and, in accordance with step 430, can set rotation speed of motorized spool 32 to match the anticipated pitch rate of UAV 10. In some instances, motorized spool 32 may be set to wind/unwind based the anticipated movement/positioning and the tension force of tether assembly 20 meeting or exceeding the predetermined tension threshold. Accordingly, the rotation speed of motorized spool 32 can be set by controller 300 to match the rate of change in tension force of tether assembly 20.

In one example, in accordance with step 410, if the anticipated movement of the UAV 10 is roll left/right based on the UAV signal received being roll left/right, controller 300, in accordance with step 420, can set motorized spool 32 to wind/unwind and, in accordance with step 430, can set rotation speed of motorized spool 32 to match the anticipated roll rate of UAV 10. In some instances, motorized spool 32 may be set to wind/unwind based on the anticipated movement/positioning and the tension force of tether assembly 20 meeting or exceeding the predetermined tension threshold. Accordingly, the rotation speed of motorized spool 32 can be set by the controller 300 to match the rate of change in tension force of tether assembly 20.

In another example, in accordance with step 410, if the anticipated movement of hook assembly 120 of QRM 100 of UAV 10 is rapid descent based on the UAV signal received being quick release, controller 300, in accordance with step 420, can set motorized spool 32 to spooling and, in accordance with step 430, can set rotation speed of motorized spool 32 to a speed faster than a rate of descent of hook assembly 120 of QRM 100 to ensure controlled and safe descent of the tether assembly 20.

In a further example, in accordance with step 410, if the anticipated movement of UAV 10 is a flight plan or series of anticipated movement based on the UAV signal received being base return, controller 300, in accordance with step 420, can dynamically set motorized spool 32 to wind/unwind to adjust for the series of anticipated movements during the flight plan to the ground station 30 and, in accordance with step 430, can dynamically set rotation speed of motorized spool 32 to dynamically match the changes in speed during flight.

In one example, in accordance with step 10, if the anticipated movement of UAV 10 is rapid descent based on the UAV signal received being failure state, controller 300, in accordance with step 420, can set motorized spool 32 to spooling and, in accordance with step 430, can set rotation speed of motorized spool 32 to a speed faster than a rate of descent of UAV 10 to ensure a safe controlled crash of UAV 10. Advantageously, the system can be configured to provide a controlled crash that is effectively a mitigation or safety feature against free fall and resultant injury to a pedestrian and/or damage to an object or asset (e.g., over highly expensive aircraft such as a USAF C5 if a critical failure occurs). Such controlled crash can protect pedestrians and objects/assets, such that, for example, a high rate of spooling can intentionally result in a crash of UAV 10 with a smart or automated tether assembly ground station that avoids pedestrians and/or objects/assets. Such smart or automated tether assembly ground station can be provided as an addition and/or an alternative to, for example, a descension assist feature such as a parachute.

Figure 5:
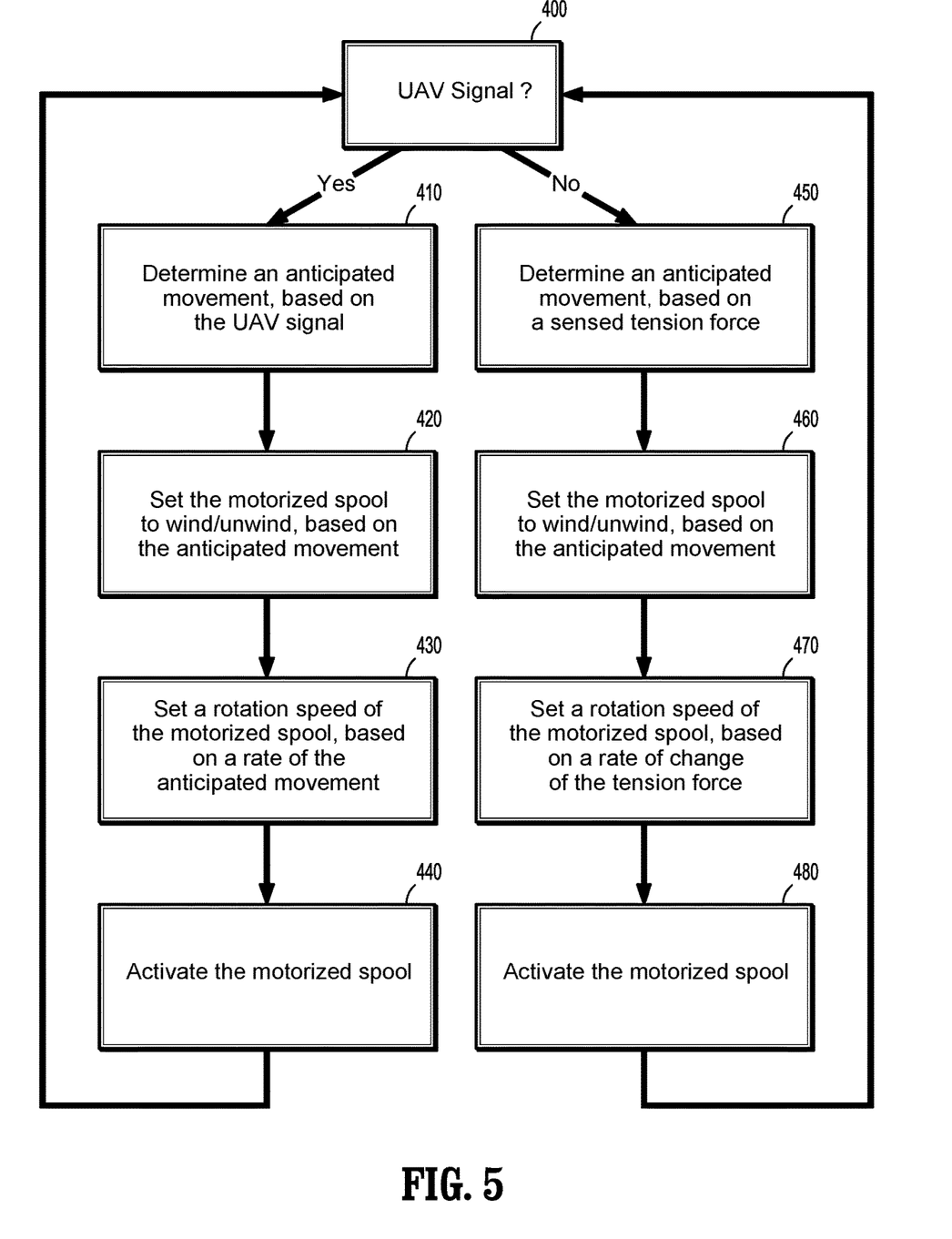
FIG. 5 is a flow diagram of an exemplary operation of dynamic wind/unwind of a tether assembly based on anticipated and non-anticipated movement of the UAV of FIG. 1.

With continued reference to FIG. 5, step 400 illustrates when no UAV signal is generated, or the UAV signal is not received by controller 300. If no signal is received by controller 300, at step 450, an anticipated movement can be determined by the tension force meeting or exceeding the predetermined threshold. Once the anticipated movement is determined, at step 460, controller 300 can set motorized spool 32 to wind/unwind based on the tension force. For instance, controller 300 can set motorized spool 32 to spooling to prevent unnecessary slack in tether assembly 20 if the tension force is exceedingly low with respect to the predetermined threshold. Further, controller 300 can set motorized spool 32 to unspooling to prevent unnecessary tension in tether assembly 20 if the tension force is exceedingly high with respect to the predetermined threshold. Upon setting motorized spool 32 to wind/unwind according to the tension force, at step 470, controller 300 can set a rotation speed of motorized spool 32 based on the rate of change of the tension force.

Once controller 300 sets motorized spool 32 to wind/unwind and the rotation speed of motorized spool 32, at step 480, controller 300 can activate the motorized spool 32 simultaneously with an actual movement of UAV 10, therefore preventing unnecessary slack and/or tension in tether assembly 20 during actual movement. During and/or after activation of the motorized spool 32, controller 300 returns to step 400, and receives UAV signal and/or tension force to further adjust motorized 32 to anticipate the movement of UAV 10 more accurately. Additionally, and/or alternatively, controller 300 can passively receive UAV signal and/or tension force during each step to anticipate sudden changes in the anticipated movement of UAV 10.

For example, in some instances, UAV 10 may suffer some failure or loss of power that does not generate a UAV signal. Accordingly, based on a rapid change in the tension force meeting or exceeding the predetermined threshold, controller 300, according to step 450, can set motorized spool 32 to spooling and, in accordance with step 460, can set rotation speed of motorized spool 32 to a speed faster that rate of descent of UAV 10 to ensure safe controlled crash of UAV 10.

In some instances, UAV 10 may experience some external influences, such as a gust of wind, that may not generate a UAV signal. Accordingly, based on the change in the tension force meeting or exceeding the predetermined threshold, controller 300, according to step 450, dynamically sets motorized spool 32 to wind/unwind to account for the external influence on UAV 10 and, in accordance with step 460, controller 300 can set rotation speed of motorized spool 32 to dynamically match the rate of change in movement due to the external influence. As a result, any external influence on UAV 10 that may cause slack or tension in tether assembly 20 is dynamically compensated.

It should be understood that the disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices (and/or servers) can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controllers includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an JOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An unmanned aerial vehicle system, comprising:
an unmanned aerial vehicle;
a user input device configured to generate a signal and control the unmanned aerial vehicle based on the generated signal; and
a ground station coupled to the unmanned aerial vehicle via a tether assembly, the ground station including:
a motorized spool coupled to the tether assembly and configured to electromechanically control spooling and unspooling of a tether of the tether assembly; and
a controller configured to control operation of the motorized spool based on an anticipated movement of the unmanned aerial vehicle, the controller configured to set the motorized spool to wind or unwind based on the anticipated movement of the unmanned aerial vehicle causing anticipated slack in the tether assembly, and the controller configured to set a spooling rate of the motorized spool to match a rate of the anticipated movement.

2. The unmanned aerial vehicle system of claim 1, wherein the ground station further includes a sensor operably associated with at least one of the motorized spool or the tether assembly, the sensor configured to detect a tension force between the unmanned aerial vehicle and the ground station.

3. The unmanned aerial vehicle system of claim 2, wherein the controller is further configured to control operation of the motorized spool based on the detected tension force.

4. The unmanned aerial vehicle system of claim 3, wherein the anticipated movement of the unmanned aerial vehicle is determined based on the detected tension force meeting a predetermined threshold.

5. The unmanned aerial vehicle system of claim 4, wherein the detected tension force meeting the predetermined threshold is caused by at least one of environmental conditions acting on the unmanned aerial vehicle or loss of power of the unmanned aerial vehicle.

6. The unmanned aerial vehicle system of claim 1, wherein the anticipated movement of the unmanned aerial vehicle is determined based on the generated signal used to control the unmanned aerial vehicle.

7. An unmanned aerial vehicle system, comprising:
an unmanned aerial vehicle;
a user input device configured to generate a signal and control the unmanned aerial vehicle based on the generated signal; and
a ground station coupled to the unmanned aerial vehicle via a tether assembly, the ground station including:
a motorized spool coupled to the tether assembly and configured to electromechanically control spooling and unspooling of a tether of the tether assembly; and
a controller configured to control operation of the motorized spool based on an anticipated movement of the unmanned aerial vehicle, wherein the controller is configured to:
set the motorized spool to unspooling based on the anticipated movement of the unmanned aerial vehicle causing anticipated tension in the tether assembly; and
set an unspooling rate of the motorized spool to match a rate of the anticipated movement.

8. An unmanned aerial vehicle system, comprising:
an unmanned aerial vehicle;
a user input device configured to generate a signal and control the unmanned aerial vehicle based on the generated signal; and
a ground station coupled to the unmanned aerial vehicle via a tether assembly, the ground station including:

a motorized spool coupled to the tether assembly and configured to electromechanically control spooling and unspooling of a tether of the tether assembly; and a controller configured to control operation of the motorized spool based on an anticipated movement of the unmanned aerial vehicle, wherein the anticipated movement of the unmanned aerial vehicle is an activation of a quick release mechanism of the unmanned aerial vehicle; and wherein the controller is configured to set the motorized spool to spooling based on the activation of the quick release mechanism of the unmanned aerial vehicle rapidly causing anticipated slack in the tether assembly, and wherein the controller is configured to set a spooling rate of the motorized spool to exceed a rate of descent of the tether assembly.

9. An unmanned aerial vehicle system, comprising:

an unmanned aerial vehicle;

a user input device configured to generate a signal and control the unmanned aerial vehicle based on the generated signal; and a ground station coupled to the unmanned aerial vehicle via a tether assembly, the ground station including:

a motorized spool coupled to the tether assembly and configured to electromechanically control spooling and unspooling of a tether of the tether assembly; and a controller configured to control operation of the motorized spool based on an anticipated movement of the unmanned aerial vehicle, wherein the anticipated movement includes at least one of throttle high, throttle low, yaw left/right, pitch forward/backwards, and/or roll left/right.

10. A method of closed loop control of a tether assembly of an unmanned aerial vehicle, the method comprising:

determining an anticipated movement of the unmanned aerial vehicle;

setting, based on the anticipated movement, a motorized spool to one of spooling or unspooling;

setting a speed of the motorized spool based on an anticipated rate of the anticipated movement of the unmanned aerial vehicle; and activating, prior to movement of the unamend aerial vehicle, the motorized spool to electromechanically control spooling and unspooling of a tether of the tether assembly to prevent one of slack or tension in the tether assembly.

11. The method according to claim 10, wherein the anticipated movement is determined based on a UAV signal generated by a user input device.

12. The method according to claim 11, wherein the UAV signal generated by the user input device is configured to control the unmanned aerial vehicle.

13. The method according to claim 10, wherein the anticipated movement is determined based on a tension force, sensed by a sensor operably associated with at least one of the motorized spool or the tether assembly, meeting a predetermined threshold.

14. The method according to claim 13, wherein the tension force meeting the predetermined threshold is caused by at least one of:

environmental conditions acting on the unmanned aerial vehicle;

environmental conditions acting on the tether assembly; or a loss of power of the unmanned aerial vehicle.

15. The method according to claim 13, wherein the anticipated rate of the anticipated movement of the unmanned aerial vehicle is based on a rate of change in the tension force.

16. The method according to claim 10, wherein the anticipated movement of the unmanned aerial vehicle is an activation of a quick release mechanism of the unmanned aerial vehicle, and the anticipated rate of the anticipated movement is a spooling rate that exceeds a rate of descent of the quick release mechanism of the unmanned aerial vehicle.

17. The method according to claim 10, wherein the anticipated movement is at least one of: throttle high, throttle low, yaw left/right, pitch forward/backwards, or roll left/right.

18. The unmanned aerial vehicle system of claim 9, wherein the ground station further includes a sensor operably associated with at least one of the motorized spool or the tether assembly, the sensor configured to detect a tension force between the unmanned aerial vehicle and the ground station.

19. The unmanned aerial vehicle system of claim 18, wherein the controller is further configured to control operation of the motorized spool based on the detected tension force.

20. The unmanned aerial vehicle system of claim 9, wherein the anticipated movement of the unmanned aerial vehicle is determined based on the generated signal used to control the unmanned aerial vehicle.

* * * * *